US007710362B2

(12) United States Patent
Cho

(10) Patent No.: US 7,710,362 B2
(45) Date of Patent: May 4, 2010

(54) ELECTRON EMISSION DISPLAY (EED) AND METHOD OF DRIVING THE SAME

(75) Inventor: Duck-Gu Cho, Suwon-si (KR)

(73) Assignee: Samsung SDI Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1337 days.

(21) Appl. No.: 11/151,215

(22) Filed: Jun. 14, 2005

(65) Prior Publication Data

US 2006/0033444 A1 Feb. 16, 2006

(30) Foreign Application Priority Data

Jun. 30, 2004 (KR) ..................... 10-2004-0050523

(51) Int. Cl.
*H01J 1/62* (2006.01)
*H01J 63/04* (2006.01)
*H05B 37/00* (2006.01)
*H05B 39/00* (2006.01)
*G09G 3/10* (2006.01)
*G09G 3/20* (2006.01)
*G09G 3/22* (2006.01)
*G09G 5/00* (2006.01)
*G06F 3/038* (2006.01)

(52) U.S. Cl. ...................... 345/75.2; 313/496; 315/167; 315/168; 315/169.1; 315/169.2; 345/204

(58) Field of Classification Search ......... 313/495–497; 315/167–169.4; 345/204, 208, 210, 55, 75.2
See application file for complete search history.

(56) References Cited

U.S. PATENT DOCUMENTS

| | | | | |
|---|---|---|---|---|
| 5,910,792 | A * | 6/1999 | Hansen et al. | 345/74.1 |
| 6,104,139 | A * | 8/2000 | Elloway et al. | 315/169.3 |
| 6,169,371 | B1 * | 1/2001 | Zimlich et al. | 315/169.1 |
| 6,404,136 | B1 * | 6/2002 | Murray et al. | 315/169.1 |
| 6,420,726 | B2 * | 7/2002 | Choi et al. | 257/10 |
| 6,459,209 | B1 | 10/2002 | Elloway | |
| 7,122,967 | B2 * | 10/2006 | Jo et al. | 315/169.1 |
| 2001/0050537 | A1 | 12/2001 | Itoh et al. | |

FOREIGN PATENT DOCUMENTS

| | | |
|---|---|---|
| CN | 1501347 A | 6/2004 |
| JP | 07-230777 | 8/1995 |
| JP | 2003-228316 | 8/2003 |

OTHER PUBLICATIONS

*Office Action* from the Chinese Patent Office issued in Applicant's corresponding Chinese Patent Application No. 200510089695.6 dated Jan. 25, 2008.

Transmittal Letter and Chinese Certificate of Patent for Invention issued on Aug. 12, 2009 in Applicant's corresponding Chinese patent application No. 200510089695.6.

* cited by examiner

*Primary Examiner*—Alexander S. Beck
(74) *Attorney, Agent, or Firm*—Robert E. Bushnell, Esq.

(57) ABSTRACT

An electron emission display (EED) includes an anode and a panel electrode unit comprising a scan electrode that extends in one direction of a lattice type panel and a data electrode that extends across the scan electrode. In the display and a method of driving the same, when power is supplied to the electron emission display, an anode voltage is applied to drive the anode, and a voltage is applied to at least one electrode of the panel electrode unit when the anode voltage is equal to or higher than a reference voltage.

8 Claims, 6 Drawing Sheets

ELECTRON EMISSION DISPLAY (EED) AND METHOD OF DRIVING THE SAME

CLAIM OF PRIORITY

This application makes reference to, incorporates the same herein, and claims all benefits accruing under 35 U.S.C. §119 from an application for ELECTRON EMISSION DISPLAY AND METHOD OF DRIVING THE SAME earlier filed in the Korean Intellectual Property Office on Jun. 30, 2004 and there duly assigned Serial No. 2004-50523.

BACKGROUND OF THE INVENTION

1. Technical Field

The present invention relates to an electron emission display (EED) and, more particularly, to an electron emission display that controls a power sequence.

2. Related Art

A field emission display (FED), which is an electron emission display using a cold cathode, can be categorized into a field emitter (FE) type electron emission display, a metal-insulator-metal (MIM) type electron emission display, a metal-insulator-semiconductor (MIS) type electron emission display, a surface conduction electron emission display (SED), and a ballistic electron surface-emitting display (BSD).

In an FE type electron emission display, an emitter that facilitates electron emission due to an electric field in a vacuum is formed, and electrons are emitted from an emitter array. The emitter is formed of a material having a large β function (i.e., aspect ratio) and a small β function (i.e., work function).

An MIM type electron emission display or an MIS type electron emission display operates based on quantum mechanical tunneling, and employs an emitter including an MIM or MIS structure. In the MIM or MIS type electron emission display, a voltage is applied between both metal layers, or between a metal layer and a semiconductor layer, in which an insulator is inserted, so that electrons move from a metal layer or semiconductor layer having a high electric potential to a metal layer having a low electric potential.

A BSD operates on the principle that, if semiconductor size is reduced to a size range that is smaller than a mean free path of electrons in the semiconductor, the electrons are transported without scattering. The BSD includes an electron transporting layer (ETL), which is disposed on an ohmic electrode and formed of a metal or semiconductor, and an insulating layer, a thin metal layer, and a phosphor layer, which are disposed on the ETL. Thus, electrons are emitted by supplying power to the ohmic electrode and the thin metal layer so as to excite the phosphor layer, thereby emitting light.

In an SED, a current is horizontally supplied to the surface of a small-area thin layer disposed on a substrate so as to emit electrons, and a pair of a first electrode and a second electrode are formed on a first substrate so as to face each other. A first conductive layer and a second conductive layer are disposed adjacent to each other so as to cover the surfaces of the first and second electrodes, respectively. An electron emission unit is interposed between the first and second conductive layers. Also, Red (R), Green (G), and Blue (B) phosphor layers, each adjacent pair of which is separated by a black matrix layer, are alternately arranged on an anode above a second substrate.

In the SED, power is supplied to the first and second electrodes so that a current flows horizontally into the surface of the small-area electron emission unit. Thus, electrons are emitted from the electron emission unit and collide with the phosphor layers disposed on the anode, thereby creating a predetermined image.

Typically, an EED operates based on quantum mechanical tunneling, and involves a triode structure in which electrons are emitted due to an electric field formed by a gate electrode, and the electrons collide with phosphor layers formed on an anode to excite phosphors, thereby emitting light.

In the EED, if a predetermined driving voltage is applied to a cathode and the gate electrode, and a positive (+) voltage of several hundreds to several thousands of V is applied to the anode, an electric field is produced around an electron emission source due to a voltage difference between the cathode and the gate electrode, thereby emitting electrons. The electrons are transported toward the anode to which the high voltage is applied, and collide with corresponding phosphor layers so as to emit light. As a result, a predetermined image is displayed.

In driving a color FED, two kinds of addressing methods can be used, a switched anode method and a non-switched anode method.

In the switched anode method, a red (R) sub-pixel, a green (G) sub-pixel, and a blue (B) sub-pixel share a single FEA pixel, and all of the identically colored anode sub-pixels are electrically connected to one another. The switched anode method can employ a three times greater number of electron emission sources than the non-switched anode method, and the arrangement of anodes and cathodes is not very important. However, an anode voltage must be set to a certain value or less (mostly, 1 kV or less) to prevent color mixture caused by electrical breakdown between adjacent phosphor sub-pixels, and an anode voltage must be applied at a three times higher speed.

In the non-switched anode method, each sub-pixel uses an additional FEA sub-pixel, and three sub-pixels of a single pixel are electrically connected to each other. The non-switched anode method enables high-voltage operation since electrical breakdown hardly occurs between adjacent anode sub-pixels, and the method does not require conversion of an anode voltage at high speed. On the other hand, a three times greater number of gate electrodes than in the switched anode method are required. Also, since the number of electron emission sources used by each anode sub-pixel is small, each of the electron emission sources must supply a relatively large current. In addition, an alignment error between the anode and the cathode may affect color purity.

If a voltage is simultaneously applied to an anode, a gate electrode and a cathode, the anode voltage which has a rated voltage of approximately several kV is the last one to reach the rated voltage level. Accordingly, if the rated voltage is applied to the gate electrode and the cathode while the anode voltage has not yet reached its rated level, electrons emitted from the cathode are not accelerated toward the anode, but rather they flow into a gate, resulting in a leakage current. The leakage current may cut off the gate electrode, damage the electron emission sources, and waste power.

SUMMARY OF THE INVENTION

The present invention provides an electron EED and a method of driving the same, in which leakage of electrons emitted from electron emission sources into portions other than an anode can be prevented.

According to an aspect of the present invention, there is provided a method of driving an electron emission display which includes an anode and a panel electrode unit which has a scan electrode that extends in one direction of a lattice type panel and a data electrode that extends across the scan electrode. When power is supplied to the electron emission display, the method comprises the steps of applying an anode voltage to drive the anode, and applying a voltage to at least one electrode of the panel electrode unit when the anode voltage is equal to or higher than a reference voltage.

If the anode voltage is equal to or higher than the reference voltage, a scan voltage is applied to drive the scan electrode of the panel electrode unit.

If the anode voltage is equal to or higher than the reference voltage, a data voltage is applied to drive the data electrode of the panel electrode unit.

The reference voltage of the anode voltage is, preferably, 500 V or higher.

A data voltage is applied to drive the data electrode at the same time as or after the scan voltage is applied.

A scan voltage is applied to drive the scan electrode at the same time as or after the data voltage is applied.

The scan electrode comprises a gate electrode, and the data electrode comprises a cathode.

The scan electrode can comprise a cathode, and the data electrode can comprise a gate electrode.

According to another aspect of the present invention, there is provided a method of driving an electron emission display which includes an anode and a panel electrode unit which has a scan electrode that extends in one direction of a lattice type panel and a data electrode that extends across the scan electrode. When power is cut off from the electron emission display, the method comprises the steps of cutting off a voltage from at least one electrode of the panel electrode unit so as to cut off the panel electrode unit and cutting off a voltage from the anode at the same time as or after the power is cut off from at least one electrode of the panel electrode unit.

A data voltage is cut off from the data electrode at the same time as or after a scan voltage is cut off from the scan electrode of the panel electrode unit.

A scan voltage is cut off from the scan electrode at the same time as or after a data voltage is cut off from the data electrode of the panel electrode unit.

According to yet another aspect of the present invention, there is provided an electron emission display comprising an anode and a panel electrode unit which has a scan electrode that extends in one direction of a lattice type panel and a data electrode that extends across the scan electrode. The electron emission display comprises: a power supplier for outputting an anode voltage to drive the anode and a panel driving voltage to drive at least one electrode of the panel electrode unit; a driving unit for driving at least one electrode of the panel electrode unit in response to a first control signal and by receiving the panel driving voltage; a timing controller for outputting the first control signal for controlling the driving unit; an anode voltage supplier for applying the anode voltage to the anode; an anode voltage detector for detecting and dividing the anode voltage by a predetermined division ratio, and for outputting the result; a comparator for comparing the detected and divided anode voltage with a reference voltage, and for outputting the comparison result as a second control signal; and a first switch for switching the driving voltage to at least one electrode of the panel electrode unit in response to the second control signal.

The electron emission display further comprises a second switch for switching a scan voltage to a scan driver in response to the second control signal, and the driving unit comprises a scan driver for driving scan electrodes.

The electron emission display further comprises a second switch for switching a data voltage to a data driver in response to the second control signal, and the driving unit comprises a data driver for driving data electrodes.

The reference voltage is a voltage obtained by dividing a predetermined voltage of 500 V or higher by a division ratio.

The electron emission display further comprises a reference voltage setter for variably setting the reference voltage.

When power is cut off from the electron emission display, the anode voltage is cut off by the anode voltage supplier at the same time as or after the panel driving voltage is cut off from at least one electrode of the panel electrode unit by the first switch.

When power is cut off from the electron emission display, a scan voltage is cut off by a second switch at the same time as or after a data voltage is cut off by the first switch, and the anode voltage is cut off by the anode voltage supplier at the same time as or after the scan voltage is cut off.

When power is cut off from the electron emission display, a data voltage is cut off by a second switch at the same time as or after a scan voltage is cut off by the first switch, and the anode voltage is cut off by the anode voltage supplier at the same time as or after the scan voltage is cut off.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of the present invention will be described in detail with reference to the attached drawings.

The present invention is directed to an electron emission display including a scan electrode that extends in one direction of a lattice panel, a data electrode that extends across the scan electrode, and an anode, and a method of driving the same.

A field emission display (FED) as an example of the electron emission display will now be described.

The FED can be categorized into one having a top gate structure or one having an under gate structure based on the position of a gate electrode. The top gate structure comprises a cathode, a gate electrode, and an anode, which are sequentially disposed on a glass substrate. On the other hand, the under gate structure comprises a gate electrode, a cathode and an anode, which are sequentially disposed on a glass substrate.

The present invention can be applied to both the top gate type FED and the under gate type FED. Also, the present invention can be applied to a micro tip type FED, a flat type FED, and an FED having a carbon nanotube (CNT) FEA.

Figure 1:
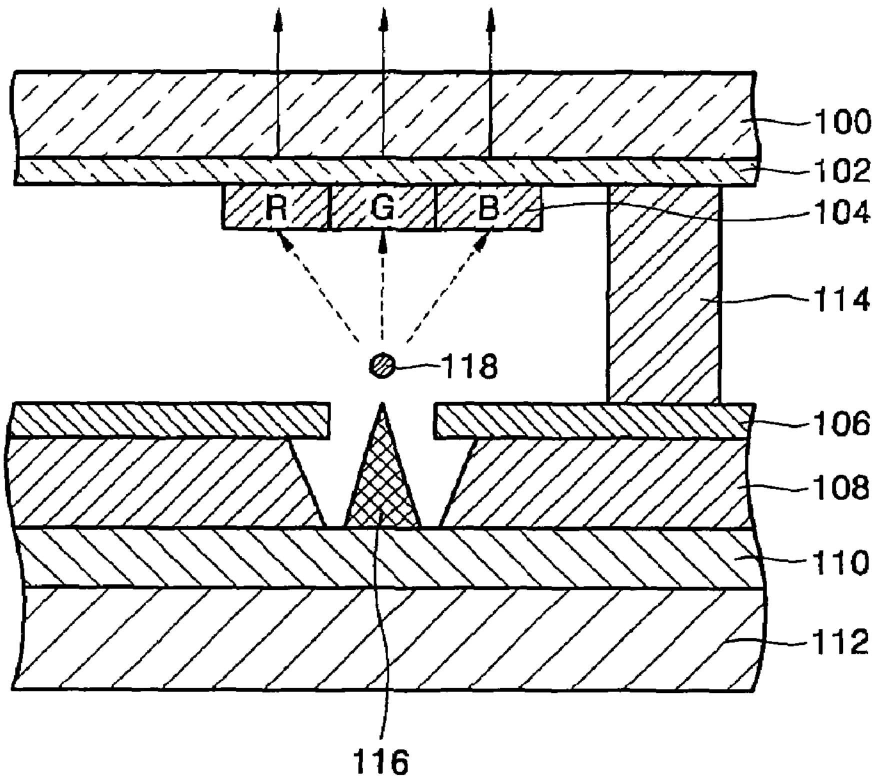
FIG. 1 shows a field emitter (FE) type electron emission display having a tip type field emission array (FEA)

FIG. 1 shows an FE type EED. The display includes a rear substrate 112, a cathode 110, a tip type FEA 116, a gate insulating layer 108, a gate electrode 106, a spacer 114, phosphors 104, an anode 102, and a front substrate 100. The operating principle of the FE type electron emission display will be described with reference to FIG. 1.

The FEA 116 operates as an ultrasmall electron gun. If a predetermined voltage of several tens of volts is applied between the cathode 110 and the gate electrode 106, electrons 118 are quantum mechanically tunneled and emitted from a microtip of the FEA 116. The emitted electrons 118 are accelerated due to a high voltage of several hundreds to several thousands of volts, which is applied to the anode 102. The electrons 118 are accelerated toward the anode 102 on which the phosphors 104 are coated, and then collide with the phosphors 104. Electrons in a certain element of the phosphors 104 are excited by an energy outputted when the electrons 118 collide with the phosphors 104, thus generating light. The microtip is typically a silicon tip or a metal tip.

The spacer 114 maintains a vacuum interval between the anode 102 and the cathode 110 at a constant value. Thus, breaking of substrates 100 and 112 due to atmospheric pressure is prevented, and crosstalk between pixels is prevented during the operation of the electron emission display.

Figure 2:
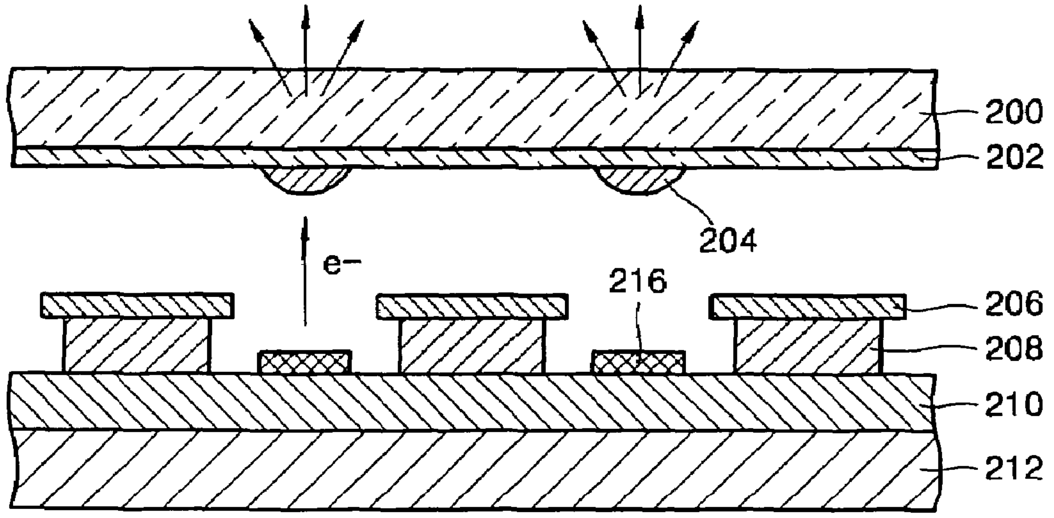
FIG. 2 shows an FE type electron emission display having a flat type FEA.

FIG. 2 shows another FE type electron emission display. The display includes a rear substrate 212, a cathode 210, a flat type FEA 216, a gate insulating layer 208, a gate electrode 206, a spacer (not shown), phosphors 204, an anode 202, and a front substrate 200. Generally, the flat type FEA 216 can be a diamond thin layer, a diamond-like carbon (DLC) thin layer, a surface conduction emitter (SCE), a ballistic electron surface emitter (BSE), an MIM, or an MIS. Respective components of the FED shown in FIG. 2 operate on the same principle as those of the FED shown in FIG. 1 except that the FEA 216 is a flat type.

Figure 3:
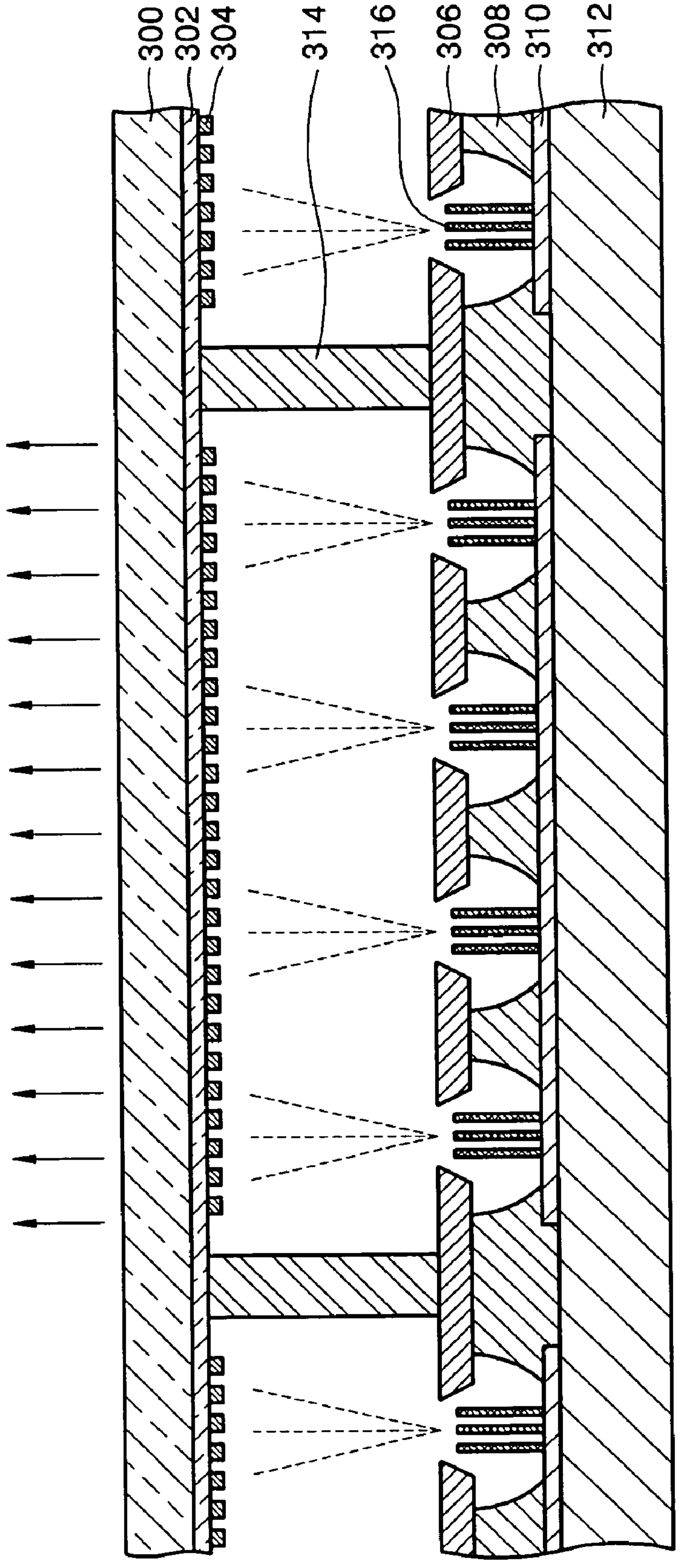
FIG. 3 shows an FE type electron emission display having a carbon nanotube (CNT) FEA.

FIG. 3 shows another FE type electron emission display. The display includes a rear substrate 312, a cathode 310, a carbon nanotube (CNT) FEA 316, a gate insulating layer 308, a gate electrode 306, a spacer 314, phosphors 304, an anode 302, and a front substrate 300. Since a CNT FEA has advantages of both the tip type and the flat type FEA, extensive studies of FEDs using the CNT have progressed in recent years. Respective components of the FED shown in FIG. 3 operate on the same principle as those of the FED shown in FIG. 1 except that the FEA 316 is a CNT type.

Figure 4:
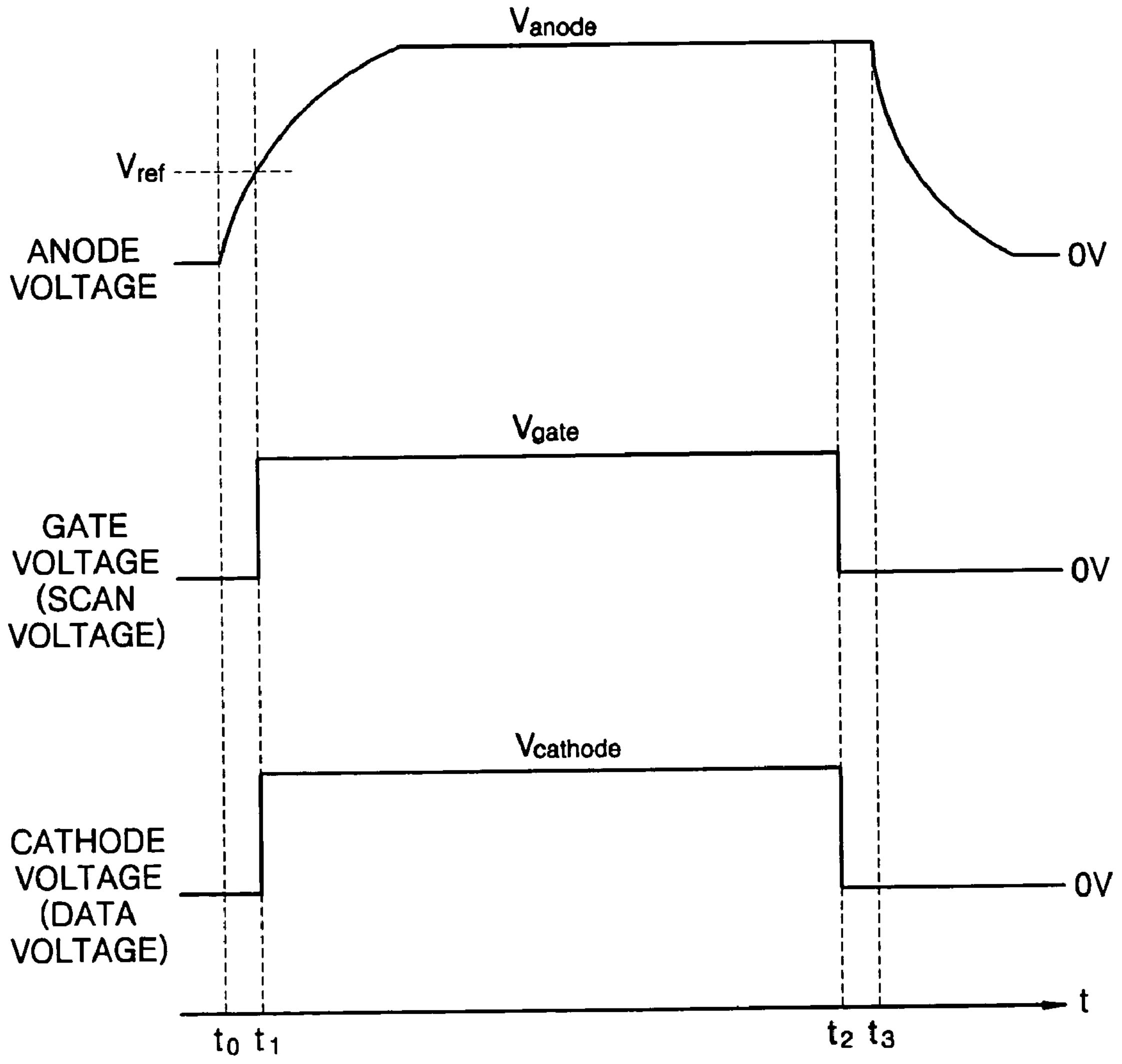
FIG. 4 is a timing diagram illustrating a method of driving an electron emission display and showing power on/off sequences according to an embodiment of the present invention.
Figure 5:
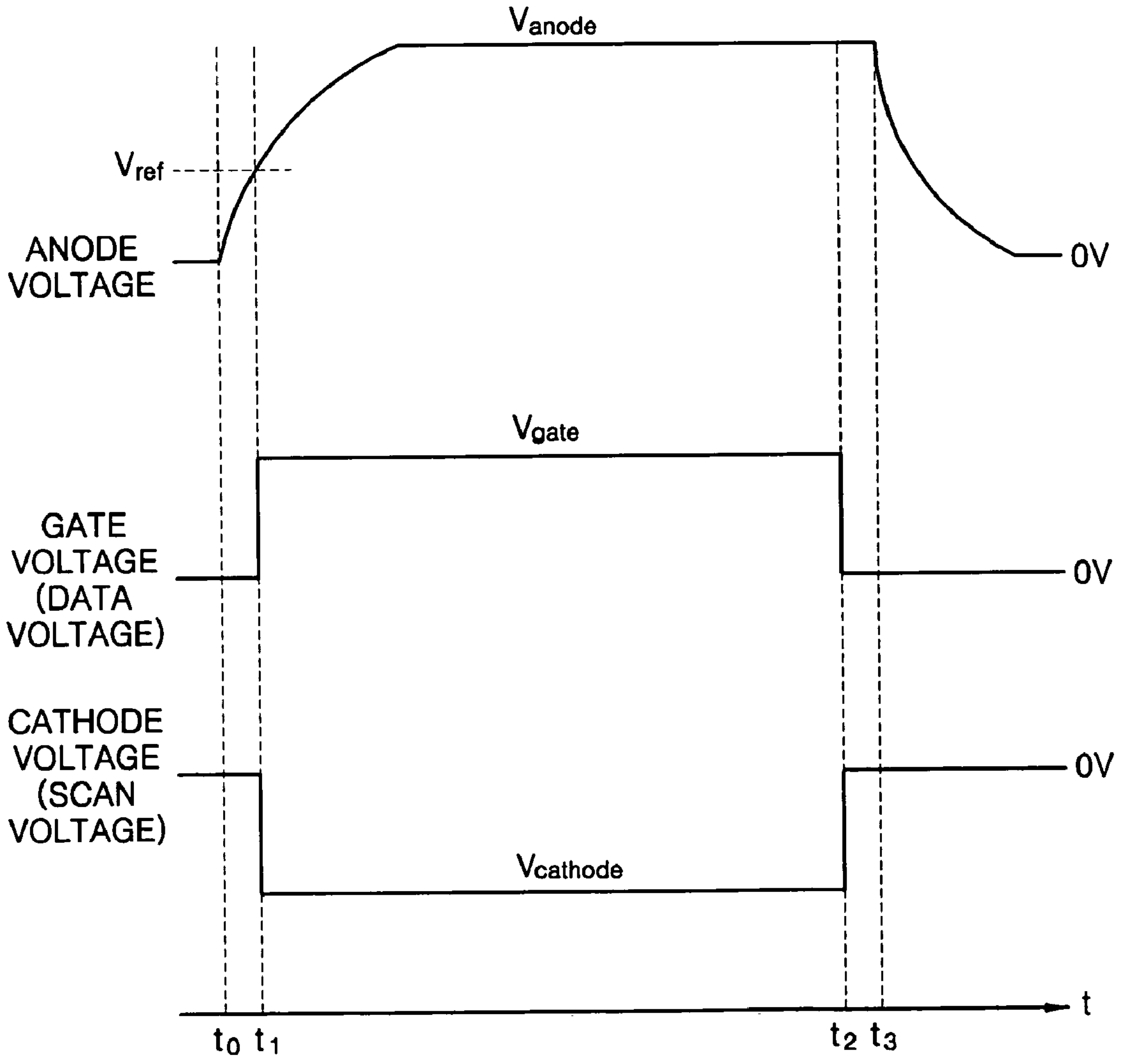
FIG. 5 is a timing diagram illustrating a method of driving an electron emission display and showing power on/off sequences according to another embodiment of the present invention.

FIGS. 4 and 5 are timing diagrams illustrating a method of driving an electron emission display and showing power on/off sequences according to embodiments of the present invention. Specifically, FIG. 4 shows the case of a top gate type FED, while FIG. 5 shows the case of an under gate type FED.

Referring to FIG. 4, in the case of the top gate type FED, a gate electrode acts as a scan electrode, while a cathode acts as a data electrode. Thus, a gate voltage $V_{gate}$ becomes the scan voltage, and a cathode voltage $V_{cathode}$ becomes the data voltage.

Referring to FIG. 5, in the case of the under gate type FED, a gate electrode acts as a data electrode, while a cathode acts as a scan electrode. Thus, a gate voltage $V_{gate}$ becomes the data voltage, and a cathode voltage $V_{cathode}$ becomes the scan voltage.

As for the top gate structure and the under gate structure, the functions of the gate electrode and the cathode and voltages applied to the respective electrodes, are shown as an example in Table 1.

TABLE 1

| | Scan electrode | Data electrode |
|---|---|---|
| Top gate structure | Gate ($V_{gate}$ = 0 V, 150 V) | Cathode ($V_{cathode}$ = 0 V, 70 V) |
| Under gate structure | Cathode ($V_{cathode}$ = −80 V, 0 V) | Gate ($V_{gate}$ = 0 V, 70 V) |

Table 1 shows the case where an emission voltage is set to 150 V, i.e., a case where electron emission occurs when the difference between gate high-level electric potential and cathode low-level electric potential is 150 V.

In the top gate structure, a scan pulse having a low level of 0 V and a high level of 150 V is applied to the gate, and a data pulse having a low level of 0 V and a high level of 70 V is supplied to the cathode. In this case, when a high-level scan pulse ($V_{gate}$=150 V) is supplied to the gate and the cathode voltage is at a low level ($V_{cathode}$=0V), electron emission occurs. In this regard, brightness of an emission cell varies with a low-level data pulse width applied to the cathode.

In the under gate structure, a scan pulse having a low level of −80 V and a high level of 0 V is applied to the cathode, and a data pulse having a low level of 0 V and a high level of 70 V is applied to the gate. In this case, when a low-level scan pulse ($V_{cathode}$=−80 V) is applied to the cathode and a gate voltage is at a high level ($V_{gate}$=70 V), electron emission occurs. In this regard, brightness of an emission cell varies with a high-level data pulse width applied to the gate.

A power-on sequence of the top gate type FED according to an embodiment of the present invention will now be described with reference to FIG. 4.

When the top gate type FED is turned on, an anode voltage $V_{anode}$ is applied to drive the anode (t=t0). As the anode voltage $V_{anode}$ increases and then becomes higher than a reference voltage Vref, a cathode voltage $V_{cathode}$ is applied to drive the cathode (i.e., a data electrode) (t=t1).

At the same time as the time at which the cathode voltage $V_{cathode}$ is applied, i.e., at t=t1, a gate voltage $V_{gate}$ is applied to drive the gate electrode (i.e., a scan electrode). Contrary to what is shown in FIG. 4, the gate voltage $V_{gate}$ can be applied after the cathode voltage $V_{cathode}$ is applied, i.e., after t=t1.

Hereinafter, a power-off sequence of the top gate type FED according to the embodiment of the present invention will be described with reference to FIG. 4. The gate voltage $V_{gate}$ applied to the gate electrode is cut off (t=t2).

At the same time as the time at which the gate voltage $V_{gate}$ is cut off, i.e., at t=t2, the cathode voltage $V_{cathode}$ is also cut off. Contrary to what is shown in FIG. 4, the cathode voltage $V_{cathode}$ can be cut off after the gate voltage $V_{gate}$ is cut off, i.e., after t=t2.

FIG. 5 shows the power sequences of the under gate type FED according to another embodiment of the present invention. A cathode voltage, which is a negative voltage, acts as the scan voltage, and a gate voltage, which is a positive voltage, acts as the data voltage. Thus, the functions of the cathode voltage and the gate voltage are different from those in the embodiment shown in FIG. 4, but the power on/off sequences of the cathode voltage and the gate voltage are the same as those in the embodiment shown in FIG. 4.

Figure 6:
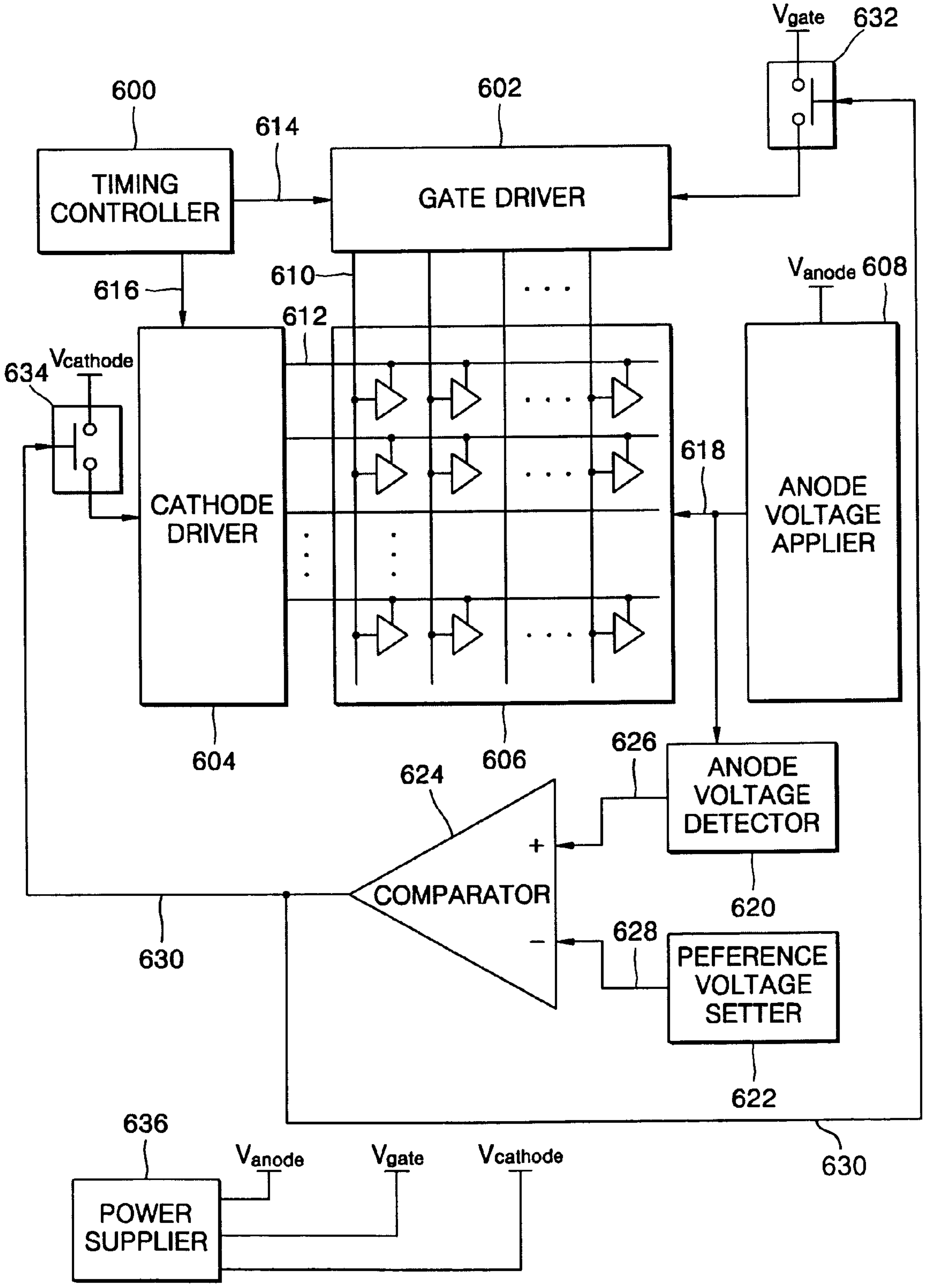
FIG. 6 is a block diagram of an electron emission display according to an embodiment of the present invention.

FIG. 6 is a block diagram of an FED according to an embodiment of the present invention. The FED comprises a power supplier 636, a cathode driver 604, a gate driver 602, a timing controller 600, an anode voltage applier 608, an anode voltage detector 620, a reference voltage setter 622, a comparator 624, a first switch 632, and a second switch 634.

The power supplier 636 outputs an anode voltage $V_{anode}$ to drive an anode, a cathode voltage $V_{cathode}$ to drive a cathode 612, and a gate voltage $V_{gate}$ to drive a gate electrode 612.

The timing controller 600 outputs a first control signal for controlling the cathode driver 604 and the gate driver 602.

The cathode driver 604 and the gate driver 602 drive the cathode 612 and the gate electrode 610, respectively, in response to the first control signal.

In a top gate structure, the gate electrode 610 acts as the scan electrode, while the cathode 612 acts as the data electrode. On the other hand, in an under gate structure, the gate electrode 610 acts as the data electrode, while the cathode 612 acts as the scan electrode.

In the case of the top gate structure, the first control signal for controlling the cathode driver 604 may includes a horizontal synchronous signal Hsync, red (R), green (G), and blue (B) data, and a vertical synchronous signal Vsync.

The anode voltage applier 608 applies an anode voltage 618 to a panel 606.

The anode voltage detector 620 detects the anode voltage, divides it by a predetermined division ratio, and outputs the result. The anode voltage can be divided into a voltage that is within an operating range of the comparator 624, for example, 12 V or less.

The comparator 624 compares the detected and divided anode voltage 626 with a reference voltage 628, and outputs the comparison result as a second control signal 630.

The first switch 632 switches a data voltage $V_{data}$ to the data driver 602 in response to the second control signal 630.

The second switch 634 switches a cathode voltage $V_{cathode}$ to the cathode driver 604 in response to the second control signal 630.

The reference voltage 628 can be a voltage obtained by dividing a predetermined voltage of 500 V or higher by the division ratio. In the present invention, the reference voltage 628 can be variably set by the reference voltage setter 622.

The reference voltage 628 can be determined depending on characteristics of a manufactured FED. If electrons emitted from an electron emission source are leaked in other portions, such as the gate or a mesh, the electron emission source can be damaged or power can be wasted. Accordingly, the reference voltage 628 can be a voltage at which electrons emitted from the electron emission source are not leaked, but are transported toward the anode. Thus, the reference voltage 628 can be 500 V depending on conditions of the cathode voltage $V_{cathode}$ and the gate voltage $V_{gate}$, which are shown by way of example in Table 1.

When power is cut off, the gate voltage $V_{gate}$ is initially cut off while maintaining the anode voltage $V_{anode}$ to prevent a leakage current. The cathode voltage $V_{cathode}$ is cut off at the same time as or after the gate voltage $V_{gate}$ is cut off, and then the anode voltage $V_{anode}$ is cut off.

Figure 7:
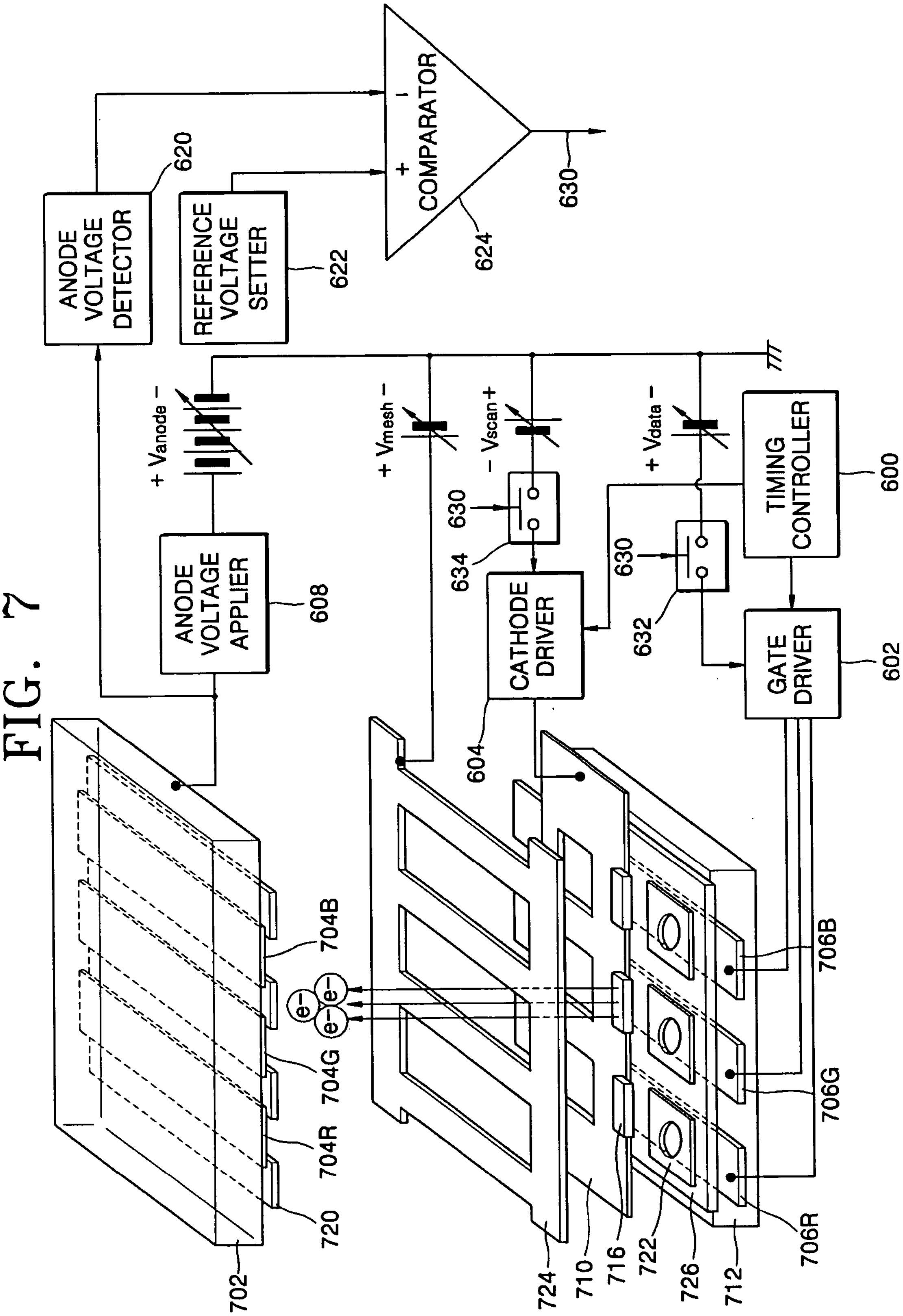
FIG. 7 is a block diagram of an under gate type FED panel, and an apparatus for driving the same, according to an embodiment of the present invention.

FIG. 7 is a block diagram of an under gate type FED panel and an apparatus for driving the same according to an embodiment of the present invention.

In FIG. 7, the same reference numerals as in FIG. 6 are used to denote the same blocks.

Referring to the under gate type FED panel of FIG. 7, anodes 704R, 704G and 704B, on which red (R), green (G) and blue (B) phosphor layers, respectively, are coated, are alternately arranged on a rear surface of a front substrate 702. A black matrix layer 720 is interposed between each adjacent pair of the anodes 704R, 704G and 704B.

On a rear substrate 712, gate electrodes 706R, 706G and 706B are arranged to correspond to the anodes 704R, 704G and 704B, respectively.

A cathode 710 is arranged across the gate electrodes 706R, 706G and 706B. An insulating layer 726 is interposed between the gate electrodes 706R, 706G and 706B and the cathode 710.

Electron emission sources 716 are formed at intersections between the gate electrodes 706R, 706G and 706B and the cathode 710.

In the under gate type FED, the gate electrodes 706R, 706G and 706B function as data electrodes and are driven by a gate driver 602. The cathode 710 functions as a scan electrode, and is driven by a cathode driver 604.

On the insulating layer 726, counter electrodes 722 are formed adjacent to the respective electron emission sources 716. The counter electrodes 722 are electrically connected to the gate electrodes 706R, 706G and 706B, respectively, by conductive plugs that are filled in through holes formed in the insulating layer 726. Thus, the counter electrodes 722 create an electric field that pushes electrons emitted from the electron emission sources 716 into the anodes 704R, 704G and 704B.

A mesh 724, which is located between the cathode 710 and the anodes 704R, 704G and 704B, and to which a mesh voltage Vmesh is applied, accelerates the electrons emitted from the electron emission sources 716 toward the anodes 704R, 704G and 704B.

The invention can also be embodied as computer readable codes on a computer readable recording medium. The computer readable recording medium is any data storage device that can store programs or data which can thereafter be read by a computer system. Examples of the computer readable recording medium include a read-only memory (ROM), a random-access memory (RAM), CD-ROMs, magnetic tapes, floppy disks, and optical data storage devices. In this regard, the programs stored in the recording medium are expressed by a series of instructions that are directly or indirectly used in a device having information processing capability, such as a computer, to obtain a specific result. Accordingly, the term "computer" refers to any kind of device which includes an input unit, an output unit and an arithmetic unit, and which has information processing capability for performing specific functions. A panel driving apparatus can be a type of computer, even if it is limited to a specific field of panel drive.

In particular, the panel driving method of the present invention is written by schematic or a VHSIC hardware description language (VHDL) on a computer, and can be connected to a computer and embodied by a programmable integrated circuit (IC), e.g., a field programmable gate array (FPGA). The recording medium includes this programmable IC.

As described above, in the electron emission display of the present invention, electrons emitted from electron emission sources are not leaked into other portions, but are transported to anodes only. Accordingly, damage to gate electrodes and electron emission sources due to a leakage current can be prevented, and waste of power is minimized.

While the present invention has been particularly shown and described with reference to exemplary embodiments thereof, it will be understood by those of ordinary skill in the art that various modifications in form and details can be made therein without departing from the spirit and scope of the present invention as defined by the following claims.

What is claimed is:

1. An electron emission display (EED), comprising:

an anode;

a panel electrode unit including a scan electrode that extends in one direction of a lattice type panel and a data electrode that extends across the scan electrode;

a power supplier for outputting an anode voltage for driving the anode and a panel driving voltage for driving at least one electrode of the panel electrode unit;

a driving unit for receiving the panel driving voltage, and for driving said at least one electrode of the panel electrode unit in response to a first control signal;

a timing controller for outputting the first control signal for controlling the driving unit;

an anode voltage supplier for applying the anode voltage to the anode;

an anode voltage detector for detecting the anode voltage, for dividing the detected anode voltage by a predetermined division ratio, and for outputting a result;

a comparator for comparing the detected and divided anode voltage with a reference voltage, and for outputting a comparison result as a second control signal; and a first switch for switching the panel driving voltage to said at least one electrode of the panel electrode unit in response to the second control signal.

2. The display of claim 1, wherein the driving unit comprises a scan driver for driving the scan electrode, said display further comprising a second switch for switching a scan voltage to the scan driver in response to the second control signal.

3. The display of claim 2, wherein, when power is cut off from the electron emission display, the scan voltage is cut off by the second switch not sooner than a data voltage is cut off by the first switch, and the anode voltage is cut off by the anode voltage supplier not sooner than the scan voltage is cut off.

4. The display of claim 1, wherein the driving unit comprises a data driver for driving data electrodes, said electron emission display further comprising a second switch for switching a data voltage to the data driver in response to the second control signal.

5. The display of claim 4, wherein, when power is cut off from the electron emission display, the data voltage is cut off by the second switch not sooner than a scan voltage is cut off by the first switch, and the anode voltage is cut off by the anode voltage supplier not sooner than the scan voltage is cut off.

6. The display of claim 1, wherein the reference voltage is a voltage obtained by dividing a predetermined voltage of at least 500 V by a division ratio.

7. The display of claim 1, further comprising a reference voltage setter for variably setting the reference voltage.

8. The display of claim 1, wherein, when power is cut off from the electron emission display, the anode voltage is cut off by the anode voltage supplier not sooner than the panel driving voltage is cut off from said at least one electrode of the panel electrode unit by the first switch.

* * * * *